(12) United States Patent
Schiefelbein, Jr.

(10) Patent No.: US 7,918,270 B2
(45) Date of Patent: Apr. 5, 2011

(54) APPARATUS FOR FLEXIBLY RESTRAINING SERVICE LOOPS IN AN OIL DERRICK TO PREVENT ENTANGLING OF THE LOOPS

(75) Inventor: John P. Schiefelbein, Jr., Huntington Beach, CA (US)

(73) Assignee: Delafield Corporation, Duarte, CA (US)

( * ) Notice: Subject to any disclaimer, the term of this patent is extended or adjusted under 35 U.S.C. 154(b) by 316 days.

(21) Appl. No.: 12/157,093

(22) Filed: Jun. 6, 2008

(65) Prior Publication Data

US 2009/0242708 A1    Oct. 1, 2009

(51) Int. Cl.
*E21B 19/00* (2006.01)
*E21B 19/22* (2006.01)
(52) U.S. Cl. ............. 166/75.11; 166/77.1; 175/207
(58) Field of Classification Search ........... 166/75.11, 166/77.1; 175/207; 248/60
See application file for complete search history.

(56) References Cited

U.S. PATENT DOCUMENTS

| | | | | |
|---|---|---|---|---|
| 379,425 | A | * | 3/1888 | Trask .............................. 248/60 |
| 1,409,760 | A | * | 3/1922 | O'Marr ........................ 175/207 |
| 4,681,169 | A | * | 7/1987 | Brookbank, III ............. 166/385 |

* cited by examiner

*Primary Examiner* — Giovanna C Wright
*Assistant Examiner* — Cathleen R Hutchins
(74) *Attorney, Agent, or Firm* — Thomas I. Rozsa

(57) ABSTRACT

An apparatus for flexibly restraining service loops in an oil derrick to prevent entangling of the loops, comprising a plurality of identical apparatus wherein each apparatus is positioned at different longitudinal level to restrain the service loops. Each apparatus is comprised of a plurality of interlocking units, wherein each unit is comprised of a central steel ring which is adhesively bonded to a braid of a service loop penetrating therethrough and exteriorly affixed to first and second interconnecting rings. A first flexible cable and second flexible cable connect the respective first and second interconnecting rings of the units of each apparatus. Therefore, the service loops are flexibly restrained to have a uniform path and bend radius when they travel longitudinally during operation of an oil well drilling machine, which results in reduction of damage of the service loops.

48 Claims, 9 Drawing Sheets

APPARATUS FOR FLEXIBLY RESTRAINING SERVICE LOOPS IN AN OIL DERRICK TO PREVENT ENTANGLING OF THE LOOPS

BACKGROUND OF THE INVENTION

1. Field of the Invention

The present invention is related to oil drilling equipment, and more particularly, to an apparatus to restrain service loops which transfer electrical, hydraulic and compressed-air power to the oil derrick top drive.

2. Description of the Prior Art

Referring to FIG. 1, a top drive drilling system which has a notation number of 3 in FIG. 1, is a common piece of machinery in an oil well drilling tower 1 in the oil drilling industry. The top drive 3 includes an AC or DC motor or a hydraulic motor which is connected to a speed reducing (torque increasing) gearbox, so that it can rotate the drill pipe to bore an oil well. The top drive is mounted in the drilling derrick and travels up and down under a control of a piece of traveling equipment 2.

Referring again to FIG. 1, there is illustrated an umbilical system 6 which is commonly called service loops. The service loops 6 are part of hoses 5 of the machinery in the oil well drilling tower, where each of the hoses transfers the respective electrical; hydraulic and compressed-air power to the top drive. There are various combinations of hoses, wires and cables that pass through the inside diameters of the service loops. Most top drive utilize a combination of two to four service loops which have approximately equal length. Each service loop at one end is attached to the derrick (or mast), and at the opposite end is connected to the top drive. As the top drive travels up and down, the service loops move accordingly up and down in the longitudinal direction. In addition, they have a bending movement in the transverse direction, which forms the respective bend radii.

The service loops 6 of the hoses vary from about 2 inches to 7 inches in diameter. In addition, there are also variations of the hose structure and materials according to their usages in the drilling process. For example, a hydraulic pressure could be up to 3000 psi, and therefore, a hose to transfer the hydraulic fluid must be mechanically enhanced by having a sufficient thickness and an appropriate material structure. In general, the service loops have a composite structure to achieve reinforced mechanical properties. The composite-structure is comprised of an inner liner, a middle braid and an outer liner. The inner and outer liners are made of thermoplastic materials or rubber. The middle braid is the composite of the thermoplastics and enhanced polymeric threads or metal wires. Therefore, the mechanically enhanced hoses have large longitudinal rigidities.

It will be appreciated that due to the variations of the hose diameters, material and structure which all affect the longitudinal flexibility of the hoses, each service loop does not always have the same bend radius. The hoses having a smaller diameter usually have a smaller bend radius, and the hoses having a larger diameter have a larger bend radius. For example, in general, hoses with two inches in diameter will have 30 inches in bend radius, hoses having three inches in diameter will have a bend radius of 42 inches, and hoses having four and half inches in diameter will have a bend radius of 48 inches. Therefore, the bottoms of the service loops travel in different paths when all the Loops having the same length travel in the longitudinal direction.

The variation in paths during operation of the machinery causes the loops to become entangled. When this happens, loops with the larger diameter have the tendency to force loops with the smaller diameter into unnatural positions, which results in premature failure of the loops with the smaller diameter. In this situation, an environmental condition such as a strong wind also plays a factor to accelerate the failure of the loops. In addition, in some cases two or more loops with the smaller diameter can displace a loop with the larger diameter, which can cause problems including broken loops.

If the loop failure happens, it will not only cause a loss in economic value due to costs to replace the damaged loops and down time for replacing the loops, but also create a hazardous situation such as leakage of the high pressured air or fluids to machine operators. Therefore, finding a solution to this problem becomes an industry priority.

Over the years there have been several attempts to design metal clamps to wrap around the loops so that proper spacing and consistent travel paths could be maintained. However, these attempts have failed due to the continual forces on the rigid clamps and the harsh environment the clamps are subjected to.

Therefore, there is a significant need to provide an apparatus for flexibly restraining the service loops to significantly improve safety conditions and increase productivity in operation of oil drilling wells.

SUMMARY OF THE INVENTION

The present invention is an apparatus for flexibly restraining service loops which are part of hoses in an oil derrick to prevent entangling of the loops, comprising a plurality of identical apparatus wherein each apparatus is positioned at different longitudinal levels to restrain the service loops, so that the service loops will have the same path and bend radius when they travel longitudinally during operation of an oil well drilling machine to minimize damage of the service loops.

In a preferred embodiment regarding structural configuration of multiple identical apparatus, each apparatus is comprised of three interlocking units which are flexibly connected together through identical first and second flexible cables, wherein three units are positioned in a same transverse level to affix the respective three service loops. In addition, each of the interlocking units has an identical structural configuration, comprising a central steel ring which is adhesively bonded to a middle section of braid of a service loop positioned to penetrate therethrough and is also exteriorly affixed to first and second interconnecting rings which are connected to the respective first and second flexible cables. Therefore, the service loops are flexibly restrained to have a uniform path and bend radius when they travel longitudinally.

Each of three steel rings is a circular upward cylindrical wall which is longitudinally positioned to adhesively bond to the braid of a service loop and affixed to the first and second interconnecting rings. The interconnecting rings are positioned to align with a plane which is transverse to the longitudinal cylindrical wall of the steel ring, wherein their ring diameters are further aligned with a diameter of the steel ring, so that the first and second interconnecting rings are symmetrically positioned relative to the centrally positioned steel ring.

In the preferred embodiment, the first flexibly restraining cable at its first end penetrates through the first interconnecting ring of the second interlocking unit, and the first end is then crimped after forming a loop to connect to the first interconnecting ring of the third unit, whereas its second end is also crimped after forming another loop to connect to the first interconnecting ring of the first unit. The second flexibly restraining cable is similarly connected to the second interconnecting rings of the respective interlocking units. Therefore, the first and third service loops are flexibly restrained to thereby have a limited transverse vibrational movement and the second service loop can have a limited sliding transverse movement between the first and third service loops when they travel longitudinally, so that their transverse movement reduces stresses applied to the apparatus which results in a reduced strain on the apparatus to thereby lead to a long usable life of the apparatus of the present invention.

In another preferred embodiment regarding flexibly connecting three interlocking units, four identical cables are used, wherein a first flexibly restraining cable is affixed to the first interconnecting rings of the respective first and second interlocking units, a second flexibly restraining cable is affixed to the second interconnecting rings of the respective first and second interlocking units, a third flexibly restraining cable is affixed to the first interconnecting rings of the respective second and third interlocking units, and a fourth flexibly restraining cable is affixed to the second interconnecting rings of the respective second and third interlocking units. Therefore, three service loops will have restrained transverse vibrational movement to reduce stresses applied to the apparatus which results in a reduced strain on the apparatus to thereby lead to a long usable life of the apparatus of the present invention.

In an additional embodiment regarding structural variations of the steel ring, a varied steel ring is manufactured by combining four pieces of arcuate wall instead of using a single circular wall, comprising a first outer piece which is threadedly connected to ends at one side of respective first and second inner pieces, and a second outer piece which is threadedly connected to ends at an opposite side of the respective first and second inner pieces, so that application of the varied steel ring significantly reduces the manufacturing costs by enabling the use of commercially available mechanically strengthened hoses in manufacturing of the service loops incorporating the present invention, wherein there is only cut a circular strip of an outer liner of a commercial hose to thereby adhesively bond the varied steel ring to a middle section of braid of the hose, which is eventually a service loop.

In a further embodiment regarding achieving a controlled tear-drop shaped loop, the apparatus is comprised of an additional three longitudinal supporting members such as rods or cables where their upper and lower ends are affixed. Each of the supporting members penetrates through the respective repeating first interconnecting rings of the respective repeating first, second and third interlocking units of the apparatus wherein a plurality of identical apparatus are positioned at different longitudinal positions of the service loops, so that the straight supporting members support service loops at one side to thereby push the other side of the service loops outward, which forms controlled tear-drop shaped loops of the service loops in operation of the oil well drilling machine.

The present invention has a second preferred embodiment of the apparatus regarding varied structural configurations of the multiple identical apparatus. Each apparatus is comprised of first and third interlocking units which only have the respective single interconnecting rings to affix the respective steel rings and a second interlocking unit which have first and second interconnecting rings, wherein a first looped flexibly restraining cable connects the interconnecting ring of the first unit and the first interconnecting ring of the second interlocking unit, and a second looped flexibly restraining cable connects the interconnecting ring of the third unit and the second interconnecting ring of the second interlocking unit, which results in the ring diameters of all the interconnection rings to align with a central line penetrating through diameters of the respective service loops. In this setting, the loops are flexibly restrained, so that they have limited transverse vibrational movement to reduce stresses applied to the apparatus, which results in a reduced strain on the apparatus to thereby lead to long usable life of the apparatus of the present invention.

Therefore, it is an object of the present invention to provide an apparatus for flexibly restraining service loops which are part of hoses in an oil derrick to prevent entangling of the loops, comprising a plurality of identical apparatus wherein each apparatus is positioned at different longitudinal levels to restrain the service loops, so that the service loops will have the same path and bend radius when they travel longitudinally during operation of an oil well drilling machine to minimize damage of the service loops.

It is another object of the present invention to provide a preferred embodiment regarding structural configurations of multiple identical apparatus. Each apparatus is comprised of three interlocking units which are flexibly connected together through identical first and second flexible cables, wherein the three units are positioned in a same transverse level to affix the respective three service loops. In addition, each of the interlocking units has an identical structural configuration, comprising a central steel ring which is adhesively bonded to a middle section of braid of a service loop positioned to penetrate therethrough and is also exteriorly affixed to first and second interconnecting rings which are connected to the respective first and second flexible cables. Therefore, the service loops are flexibly restrained to have a uniform path and bend radius when they travel longitudinally.

It is a further object of the present invention to provide each of three steel rings being a circular upward cylindrical wall which is longitudinally positioned to adhesively bond the braid of a service loop and affixed to the first and second interconnecting rings. The interconnecting rings are positioned to align with a plane which is transverse to the longitudinal cylindrical wall of the steel ring, wherein their ring diameters are further aligned with a diameter of the steel ring, so that the first and second interconnecting rings are symmetrically positioned relative to the centrally positioned steel ring.

It is an additional object of the present invention to provide the first and second flexibly restraining cables. The first cable at its first end penetrates through the first interconnecting ring of the second interlocking unit, and the first end is then crimped after forming a loop to connect to the first interconnecting ring of the third unit, whereas its second end is also crimped after forming another loop to connect to the first interconnecting ring of the first unit. The second flexibly restraining cable is similarly connected to the second interconnecting rings of the respective interlocking units. Therefore, the first and third service loops are flexibly restrained to thereby have a limited transverse vibrational movement and the second service loop can have a limited sliding transverse movement between the first and third service loops when they travel longitudinally, so that their transverse movement reduces stresses applied to the apparatus which results in a reduced strain on the apparatus to thereby lead a long usable life of the apparatus of the present invention.

It is another further object of the present invention to provide another preferred embodiment regarding flexibly connecting three interlocking units, wherein four identical cables are used. The first flexibly restraining cable is affixed to the first interconnecting rings of the respective first and second interlocking units, the second flexibly restraining cable is affixed to the second interconnecting rings of the respective first and second interlocking units, the third flexibly restraining cable is affixed to the first interconnecting rings of the respective second and third interlocking units, and the fourth flexibly restraining cable is affixed to the second interconnecting rings of the respective second and third interlocking units. Therefore, three service loops will have restrained transverse vibrational movement to reduce stresses applied to the apparatus which results in a reduced strain of the apparatus to thereby lead a long usable life of the apparatus of the present invention.

It is further object of the present invention to provide an additional embodiment regarding structural variations of the steel ring, wherein a varied steel ring is manufactured by combining four pieces of arcuate wall instead of using a single circular wall. The ring is comprised of a first outer piece which is threadedly connected to ends at one side of respective first and second inner pieces, and a second outer piece which is threadedly connected to ends at opposite sides of the respective first and second inner pieces. Therefore, application of the varied steel ring significantly reduces the manufacturing costs by enabling the use of commercially available mechanically strengthened hoses in the manufacture of the service loops incorporating the present invention, wherein there only needs to be cut a circular strip of an outer liner of a commercial hose to thereby adhesively bond the varied steel ring to a middle section of braid of the hose, which is eventually a service loop.

It is an object of the present invention to provide a further embodiment regarding achievement of a controlled tear-drop shaped loop. In the embodiment, the apparatus having the preferred multiple apparatus is comprised of additional three longitudinal supporting members such as rods or cables where their upper and lower ends are affixed. Each of the supporting members penetrates through the respective repeating first interconnecting rings of the respective repeating first, second and third interlocking units of the apparatus wherein a plurality of identical apparatus which are positioned at different longitudinal positions of the service loops, so that the straight supporting members support service loops at one side to thereby push the other side of the service loops outward, which forms controlled tear-drop shaped loops of the service loops in operation of the oil well drilling machine.

It is further object of the present invention to provide a second preferred embodiment of the apparatus incorporating varied structural configurations of the multiple identical apparatus. In the embodiment, each apparatus is comprised of first and third interlocking units which only have the respective single interconnecting rings to affix the respective steel rings and a second interlocking unit which has first and second interconnecting rings, wherein a first looped flexibly restraining cable connects the interconnecting ring of the first unit and the first interconnecting ring of the second interlocking unit, and a second looped flexibly restraining cable connects the interconnecting ring of the third unit and the second interconnecting ring of the second interlocking unit, which results in the ring diameters of all the interconnection rings being aligned with a central line penetrating through diameters of the respective service loops. In this setting, the loops are flexibly restrained so that they have limited transverse vibrational movement to reduce stresses applied to the apparatus, which results in a reduced strain on the apparatus to thereby prolong the life of the apparatus of the present invention.

It is an additional object of the present invention to provide additional variations of the structural configurations of the present invention apparatus, where the variations are as follows:

(1) the apparatus is comprised of at least two identical apparatus;

(2) each identical apparatus is comprised of at least two interlocking units for restraining at least two service loops;

(3) each interlocking unit comprised of a central steel ring is connected to the respective first and second interconnecting rings, wherein the interconnecting rings are positioned non-symmetrically relative to the central steel ring as long as the interlocking unit can function appropriately;

(4) a varied steel ring is comprised of at least two pieces of arcuate wall;

(5) each interconnecting ring is affixed including being welded to the central steel ring; and (6) each interconnecting ring has any appropriate shape including a "D" shape.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
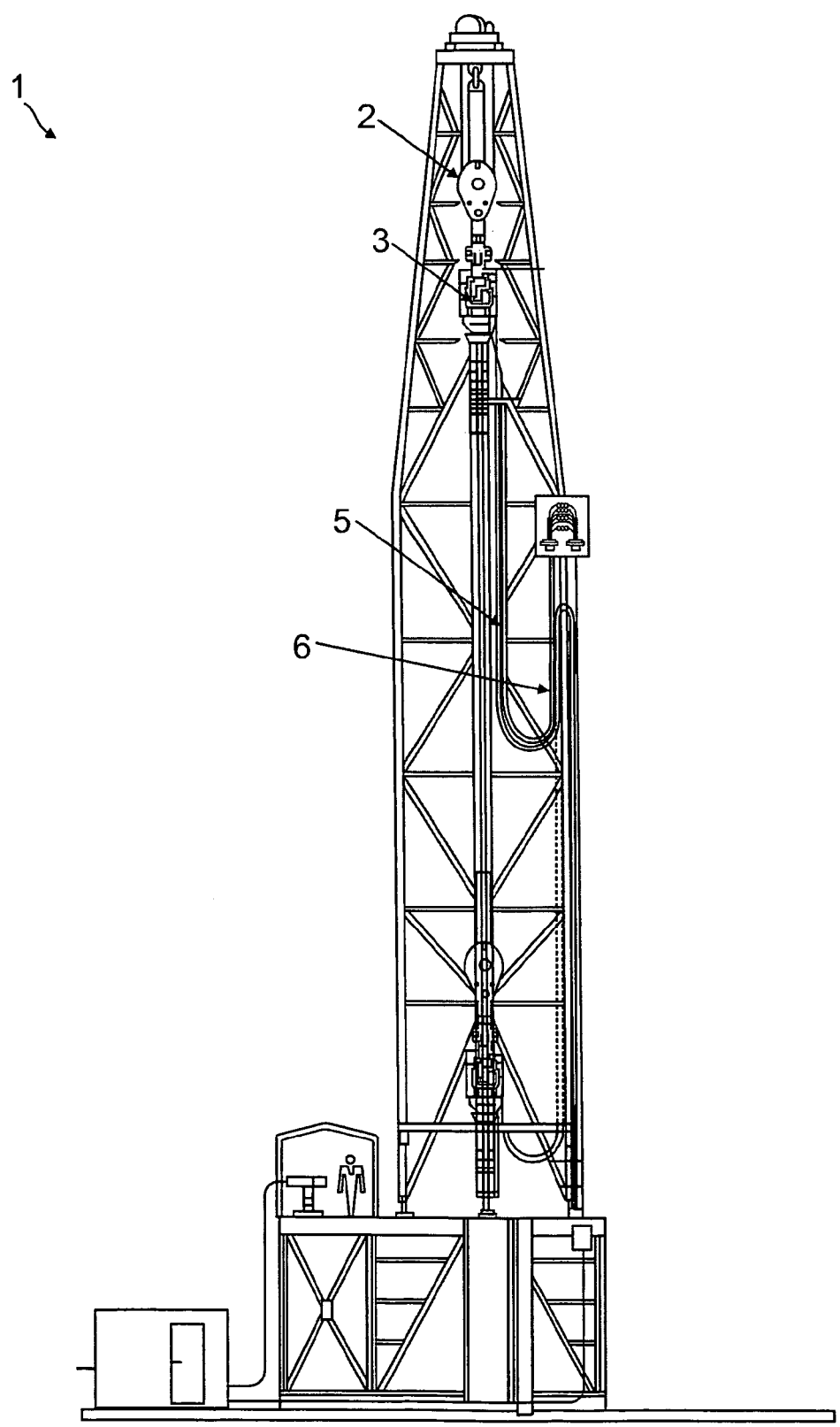
FIG. 1 is a schematic diagram of an oil well drilling tower to illustrate structural sections which are related to the present invention.
Figure 2:
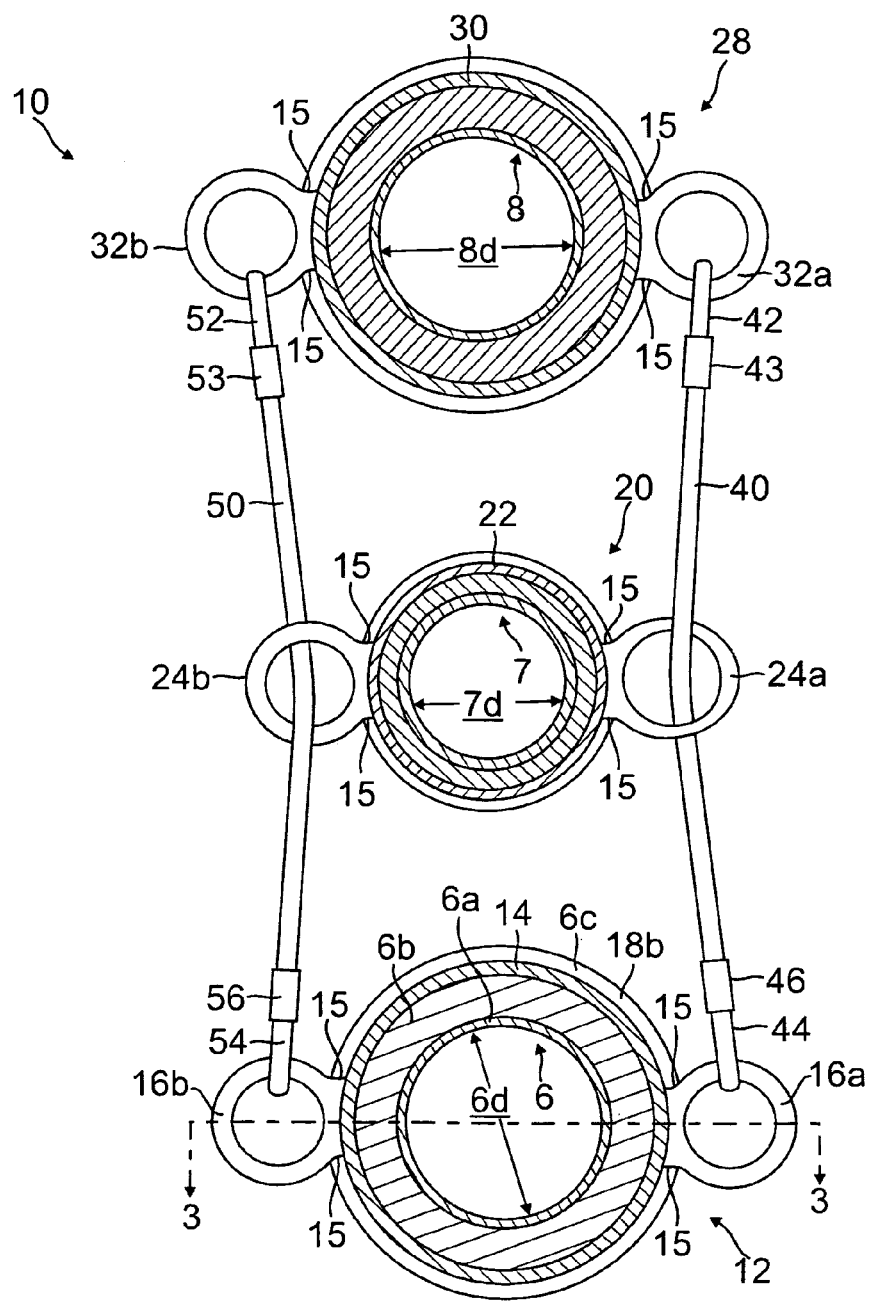
FIG. 2 is an elevational transverse cross sectional view of an apparatus from a preferred embodiment of the present invention apparatus to flexibly restrain service loops of the top drive drilling system in the oil well drilling tower.

Referring to FIG. 2, there is illustrated an apparatus 10 for a preferred embodiment of the present invention apparatus to flexibly restrain service loops, such as a first, second and third service loops 6, 7, and 8 to prevent entangling of the loops when they travel longitudinally during operation of an oil drilling machine.

The apparatus 10 is comprised of three interlocking units 12, 20 and 28, which are flexibly connected to first and second restraining cables 40 and 50, wherein they are all positioned at a same transverse level of the longitudinal service loops. However, it will be appreciated that the present invention apparatus is a grouped system, comprised of a plurality of the identical apparatus 10, wherein each of them is positioned at different longitudinal level to restrain the service loops.

The service loop 6 is comprised of an inner liner 6a, a braid 6b and an outer liner 6c.

Figure 3:
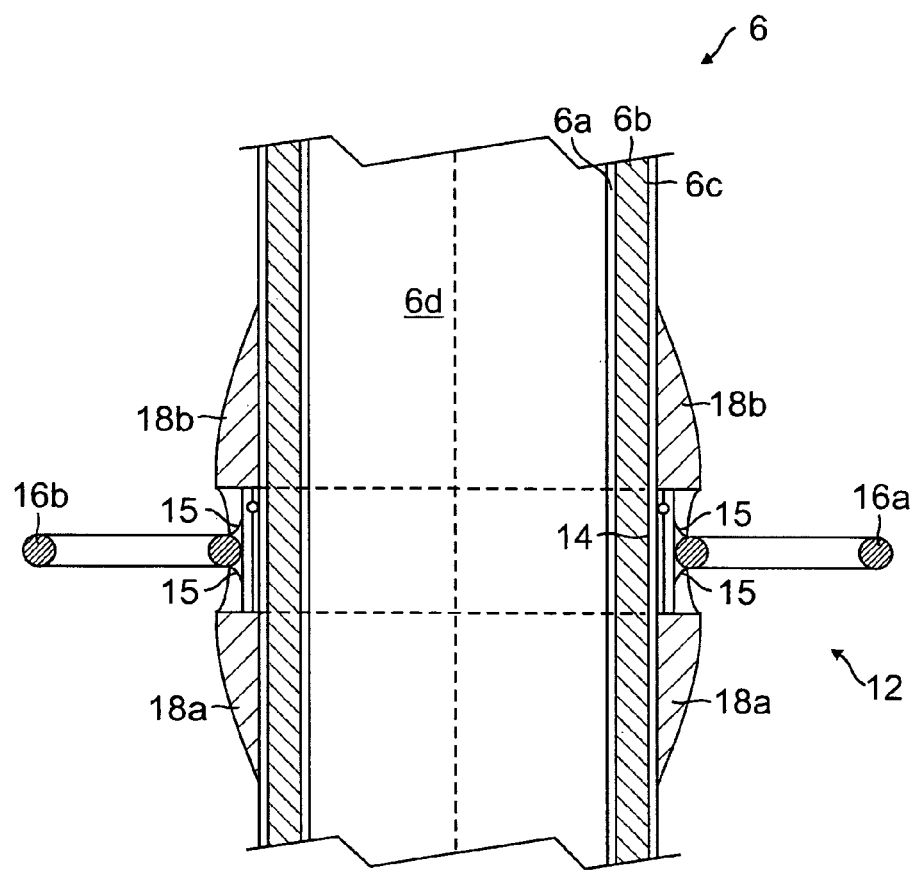
FIG. 3 is an elevational longitudinal cross sectional view of an interlocking unit of the preferred embodiment of the present invention, which is adhesively attached to a part of the service loop.

The first interlocking unit 12, which is additionally illustrated in FIG. 3 for affixing the first service loop 6, is comprised of a steel ring 14, and first and second interconnecting rings 16a and 16b. Described more broadly, the item 14 is an interior retaining means which can be a one piece ring affixed to the braid 6b or as will be described later, a ring formed of a multiplicity of of sections, some of which are affixed to the braid 6b. The ring 14 can be made of steel or any other metal or any other desirable material such as synthetic polymer. The steel ring 14 is a circular upward cylindrical wall with appropriate height and thickness. As illustrated in FIGS. 2 and 3, the steel ring 14 is longitudinally positioned to adhesively bond a braid 6b, the middle section of the first service loop 6. The first and second interconnecting rings 16a and 16b which are affixed to the steel ring 14 are positioned to align with a plane which is transverse to the longitudinal cylindrical wall 14 of the steel ring. The interconnecting rings 16a and 16b can be more broadly and respectively be described as a first interconnecting means and a second interconnecting means. The first and second interconnecting means are affixed to and extend transversely from the interior retaining means. In addition, the first and second interconnecting rings 16a and 16b are further positioned wherein their ring diameters are aligned with a diameter of the steel ring 14, so that the first and second interconnecting rings 16a and 16b are symmetrically positioned relative to the centrally positioned steel ring 14.

Although the symmetrically positioned first and second interconnecting rings are preferred, it will be appreciated that they also can be positioned non-symmetrically as long as the interlocking unit 12 can function appropriately. This means that the first and second interconnecting rings 16a and 16b which are affixed to the steel ring 14 are not positioned to align with the same plane which is transverse to the longitudinal cylindrical wall 14 of the steel ring, and the first and second interconnecting rings 16a and 16b are positioned wherein their diameters are hot aligned with the diameter of the steel ring 14. In addition, the interconnecting rings 16a and 16b are not limited to have a round shape. In stead, other shapes including a "D" shape are also within the spirit and scope of the present invention.

In the preferred embodiment, the first and second interconnecting rings 16a and 16b are welded to the jacket ring 14, wherein the weld structure is illustrated as the arcuate connecting sections 15. However, they can also be affixed to the steel ring through mechanical connection such as applying fasteners including nuts and bolts. It will be appreciated that after the welding process, the outer liner 6c is attached to the braid 6b of the hose having the inner liner 6a during manufacturing of the service loop 6 incorporating the present invention. There is a gap in the outer liner 6c to accommodate each interconnecting ring 16a.

Referring further to FIG. 3, there are illustrated first and second sections 18a and 18b of an outer jacket which are affixed to the outer liner of the first service loop 6, wherein the first section 18a is positioned below the steel ring 14, and the second section 18b is above the steel ring 14. An object to apply the outer jacket is to enhance affixation of the first interlocking unit 12 to the loop 6 and strengthen mechanical strength of the loop section where the first interlocking unit 12 is positioned. It will be appreciated that, as an alternative variation of the loop structure, the outer jacket can be manufactured as a part of the outer liner 6c of the hose. In addition, the outer jacket can be built in various ways, including being built by using self-adhesive applied to the braid or cord, enhanced thermoplastic or rubber tape to wrap the service loop 7.

Figure 4:
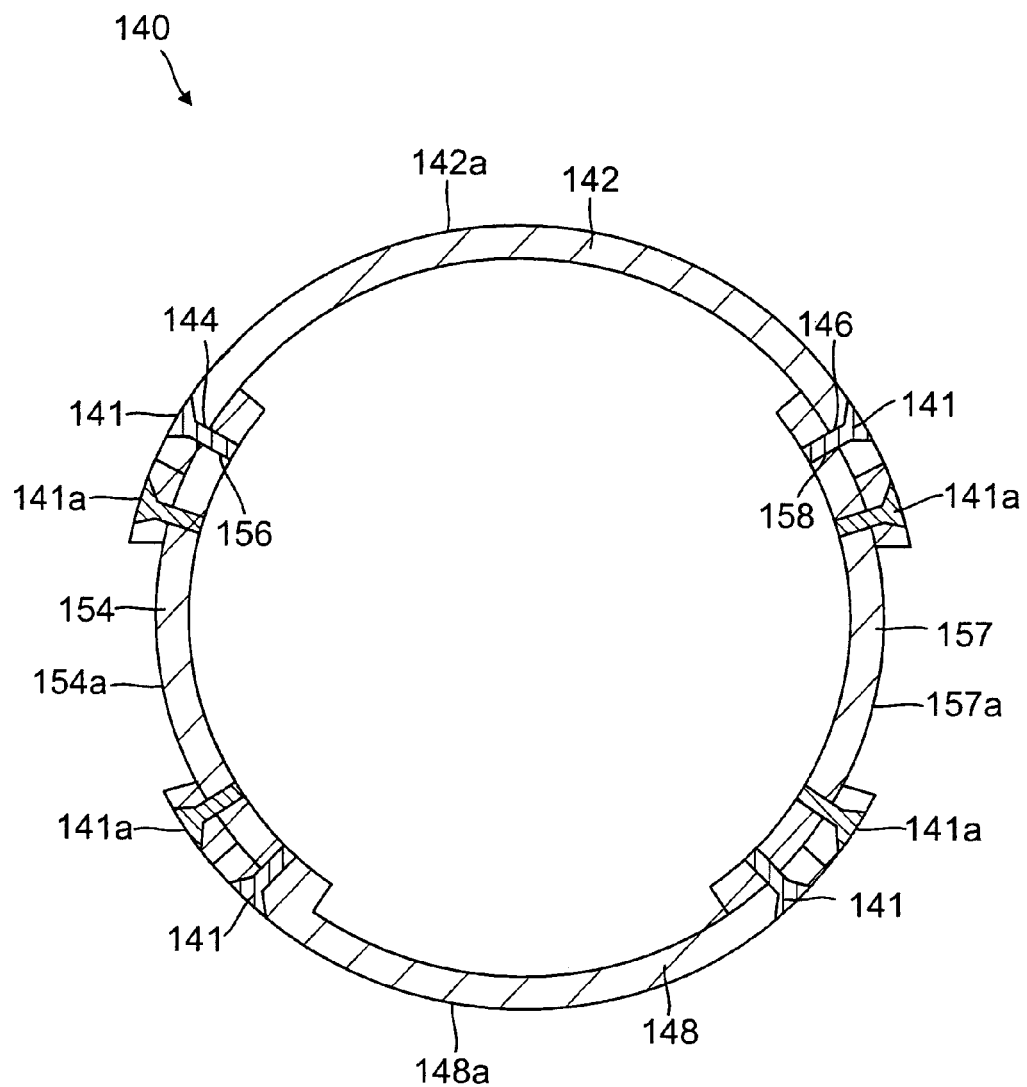
FIG. 4 is an elevational transverse cross sectional view to illustrate structural variations of a steel ring which is a part of the interlocking unit from the preferred embodiment of the present invention.

Reference to FIG. 4 illustrates structural variations of the steel ring 14 or interior retaining means of the present invention. Instead of using the single circular wall of the ring, a varied steel ring 140 is constructed by combining with four pieces of arcuate wall, including first and second outer pieces 142 and 148, and first and second inner pieces 154 and 157. As illustrated, at lest one flat-head screw 141 penetrates through a first hole 144 at one end of the first outer piece 142 to connect to a second threaded hole 156 at one end of the first inner piece 154. Similarly, at lest one flat-head screw 141 penetrates through a second hole 146 at an opposite end of the first outer piece 142 to connect to a first threaded hole 158 at one end of the second inner piece 157. In a similar fashion, the second outer piece 148 is threadedly connected to the respective first end of first inner piece 154 and second end of the second inner piece 157 with application of the respective flat-head screws. Alternatively, two sets of screws 141 and 141a can be utilized as illustrated in FIG. 4. Alternatively, instead of being affixed by screws 141 and 141a, the components can be welded together.

Following the above illustrated varied steel ring 140, it will be appreciated that a structure of a varied first interlocking unit can be realized, comprising the varied steel ring 140 which is affixed including being welded to the first and second interconnecting rings 16a and 16b. In this embodiment, the first interconnecting ring 16a is affixed to an outer surface 154a of the first inner piece 154 of the arcuate wall, and a second interlocking ring 16b is affixed to an outer surface 157a of the second inner piece 157. Similarly, for an additional embodiment, the first and second interlocking rings 16a and 16b can be affixed to the respective outer surface 142a and 148a of the respective first and second outer pieces 142 and 148 of the arcuate wall. The inner pieces 154 and 157 are also affixed to the braid 66.

It will be appreciated that the above illustrated varied steel ring 140 comprising four individual pieces is just an example of various structural variations of the steel ring 14. In fact, at least two pieces of the arcuate wall can be used for manufacturing a varied steel ring, which can be further manufactured to corresponded with a varied interlocking unit. Therefore, all these variations are within the spirit and scope of the present invention.

It will be further appreciated that an advantage to employing the varied steel ring 140 or the varied interlocking unit is to significantly reduce manufacturing costs since it enables the use of commercially available mechanically strengthened hoses in manufacturing of the service loops incorporating the present invention. Application of the varied steel ring 140 or the varied first interlocking unit only requires cutting a circular strip of the outer liner of the commercial hose to thereby adhesively bond the varied steel ring or the varied first interlocking unit to the braid of the hose, as compared with the process of using the thermoplastic materials to wrap the braid of the entire hose for forming the outer liner of the service loop 6, which is illustrated in FIG. 3 with application of the single circular steel ring 14.

While two sets of rings 16a, 16b, 24a, 24b and 32a and 32b are illustrated and have been disclosed, it is also within the spirit and scope of the present invention to have only one aligned series of rings such as 16a, 24a, and 32a or 16b, 24b and 32b on only one side of the three service loops.

Figure 5:
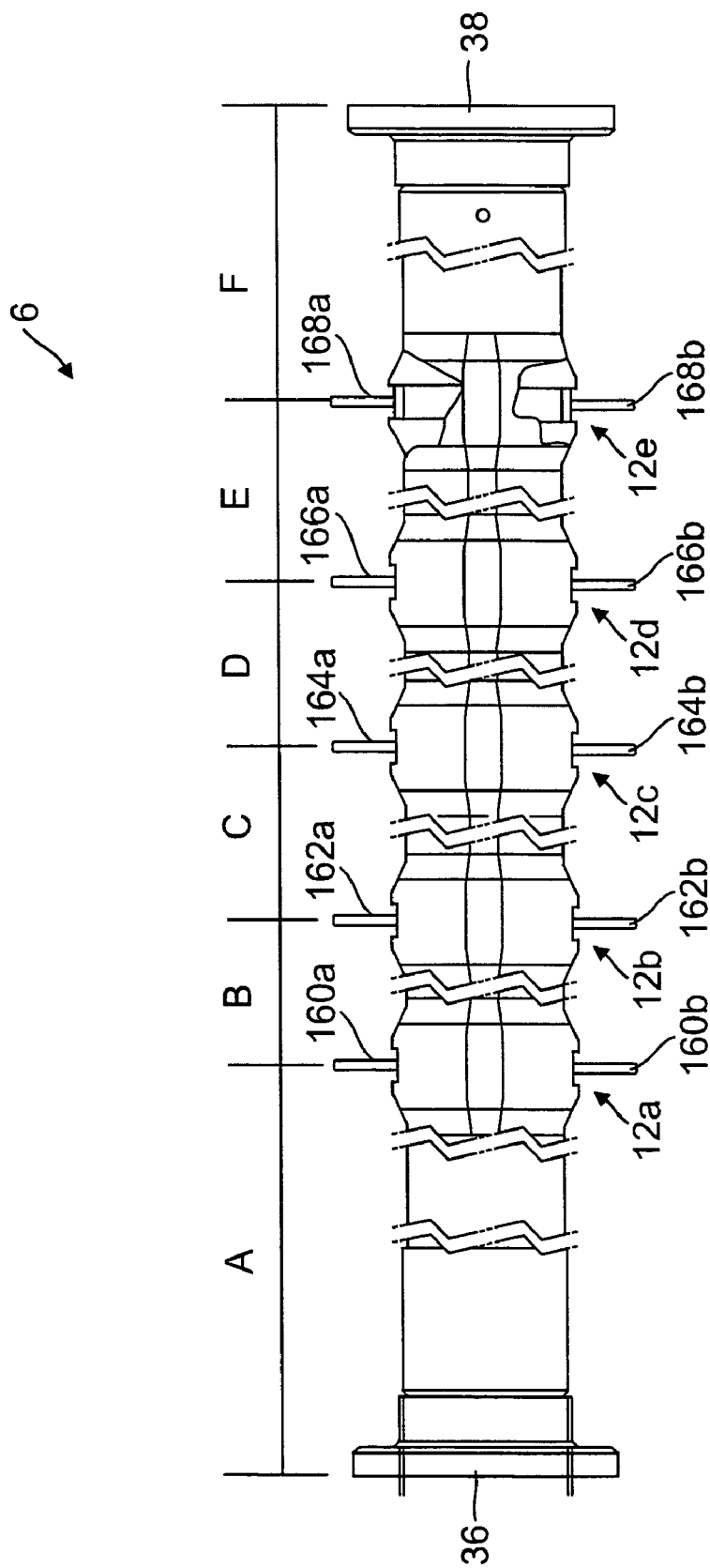
FIG. 5 is a side view of an entire service loop which is equipped with a plurality of interlocking units of the preferred embodiment of the present invention.

Referring to FIG. 5, there is illustrated the structural configuration of the first service loop 6 of the preferred embodiment of the present invention. The first service loop 6 of the hose is comprised of a first flange 36 connected to one end of the hose, five interlocking units 12a, 12b, 12c, 12d and 12e which are separately positioned along a middle section of the hose, and a second flange 38 connected the opposite end of the hose.

It will be appreciated that a service loop could have any appropriate dimensional sizes including the cross-sectional diameter, the loop length and distance between the respective flanges and interlocking units or between two adjacent interlocking units. For example, the first service loop 6 shown in FIG. 5 has a standard length of 86 feet. Referring to the figure, a length of 6 feet marked as "A" is from the first flange 36 to a first interconnecting ring 160a of the first interlocking unit 12a, a length of 9 feet marked as "B" is from the first interconnecting ring 160a to a first interconnecting ring 162a of the second interlocking unit 12b, a length of 10 feet as indicated as "C" is from the second unit 12b to the third unit 12c, a length of 10 feet as indicated as "D" is between the third unit 12c to the fourth unit 12d, a length of 15 feet as indicated as "E" is between the fourth and fifth units 12d and 12e, and a length of 36 feet as indicated as "F" is between the fifth unit 12e to the second flange 38. In application of the service loop 6, the first flange 36 is connected to the top drive, and the second flange 38 is connected to the derrick. Although the above illustration discloses five interlocking units which are positioned onto the service loop, it will be appreciated that at least two interlocking unit are also with the spirit and scope of the present invention. Each of the three service loops 6, 7, and 8 are configured with a multiplicity of spaced apart sets of interconnecting rings as illustrated in FIG. 5.

Referring to FIG. 2 again, there is illustrated second and third interlocking units 20 and 28 which are comprised of the similar structural components as compared with the first unit 12. The second unit 20 includes an interior retaining mean such as a steel ring 22 which affixed to such as adhesively bonded to a braid section of the second service loop 7, and further symmetrically connected to first and second interconnecting means such as first and second interconnecting rings 24a and 24b. The third unit 28 includes an interior retaining means such as steel ring 30 which is affixed to such as adhesively bonded to a braid section of the third service loop 8, and further symmetrically connected to first and second interconnecting mean such as first and second interconnecting rings 32a and 32b. In addition, there are corresponding jackets which are positioned adjacent the respective interlocking units 20 and 28.

As additionally illustrated in FIG. 2, the internal diameters 6d and 8d of the interior opening of the first and third service loops 6 and 8 are larger than the internal diameter 7d of the opening of the second service loop 7, which illustrates their different service functions in the oil drilling processes.

In addition to the interlocking units, a completed apparatus of the preferred embodiment of the present invention is comprised of first and second flexible restraining cables 40 and 50 having appropriate lengths. The first flexible restraining cable 40 at its first end 42 penetrates through the first interconnecting ring 24a of the second interlocking unit 20, and the first end 42 is then fed through the interconnection ring 32a of the third unit 28 and crimped with a crimping structure 43 after forming a loop to connect to the first interconnecting ring 32a of the third unit 28. Its second end 44 is fed through interconnecting ring 16a of the first unit 12a and is crimped with a crimping structure 46 after forming another loop around the first interconnecting ring 16a of the first unit 12. Similarly, the second flexible restraining cable 50 at its first end 52 penetrates through the second interconnecting ring 24b of the second unit 20 and the first end 42 is fed through interconnecting ring 32b and is then crimped at the second interconnecting ring 32b of the third unit 28 with a crimping structure 53. Its second end 54 is fed through interconnecting ring 16b and is crimped at the second interconnecting ring 16b of the first unit 12 with the crimping structure 56.

Therefore, in this embodiment a gap between the second service loop 7 and the first or third service loops 6 and 8 can be arranged to be approximately 3 to 5 inches by providing the first and second flexibly restraining cables 40 and 50 with appropriate lengths.

It will be appreciated that with the application of the apparatus 10 having the flexible restraining cables which are flexibly connected to the interlocking units adhesively bonded to the respective service loops, the first and third service loops 6 and 8 will have a vibration movement with limited transverse moving distance due to flexibility of the restraining cables 40 and 50 which are also limited when the loops move up and down in the longitudinal direction. In addition, the middle loop 7 is allowed to have a sliding movement with a relatively large transverse distance between the first and third service loops 6 and 8, Therefore, the transverse movement of the loops 6, 7 and 8 provides advantages of reduced stresses applied to the apparatus which results in reduced strains on the apparatus, as compared with the rigid clamp systems of the prior art. The advantages of the present invention lead a long usable life of the apparatus with excellent performance wherein all three service loops have a uniform bend radius and path when they travel longitudinally.

It will be appreciated that although there is illustrated five repeating interlocking units for each service loop in FIG. 5, at least two repeating interlocking units for each service loop are within the spirit and scope of the present invention of the apparatus for flexibly restraining the service loops which is comprised of at least two service loops for an oil well drilling machine.

The present invention has been described using three service loops. It will be appreciated that the present invention can be used with at least two service loops and can also be used when there are more than three service loops. While the invention is preferably used with spaced apart sets flexible restraining means which include the interior retaining means and at least one interconnecting means but preferably two interconnecting means, it will be appreciated that the use of one set of flexible restraining means using an interior retaining means and at least one but preferably two interconnecting means used with at least two service loops is within the spirit and scope of the present invention.

Figure 6:
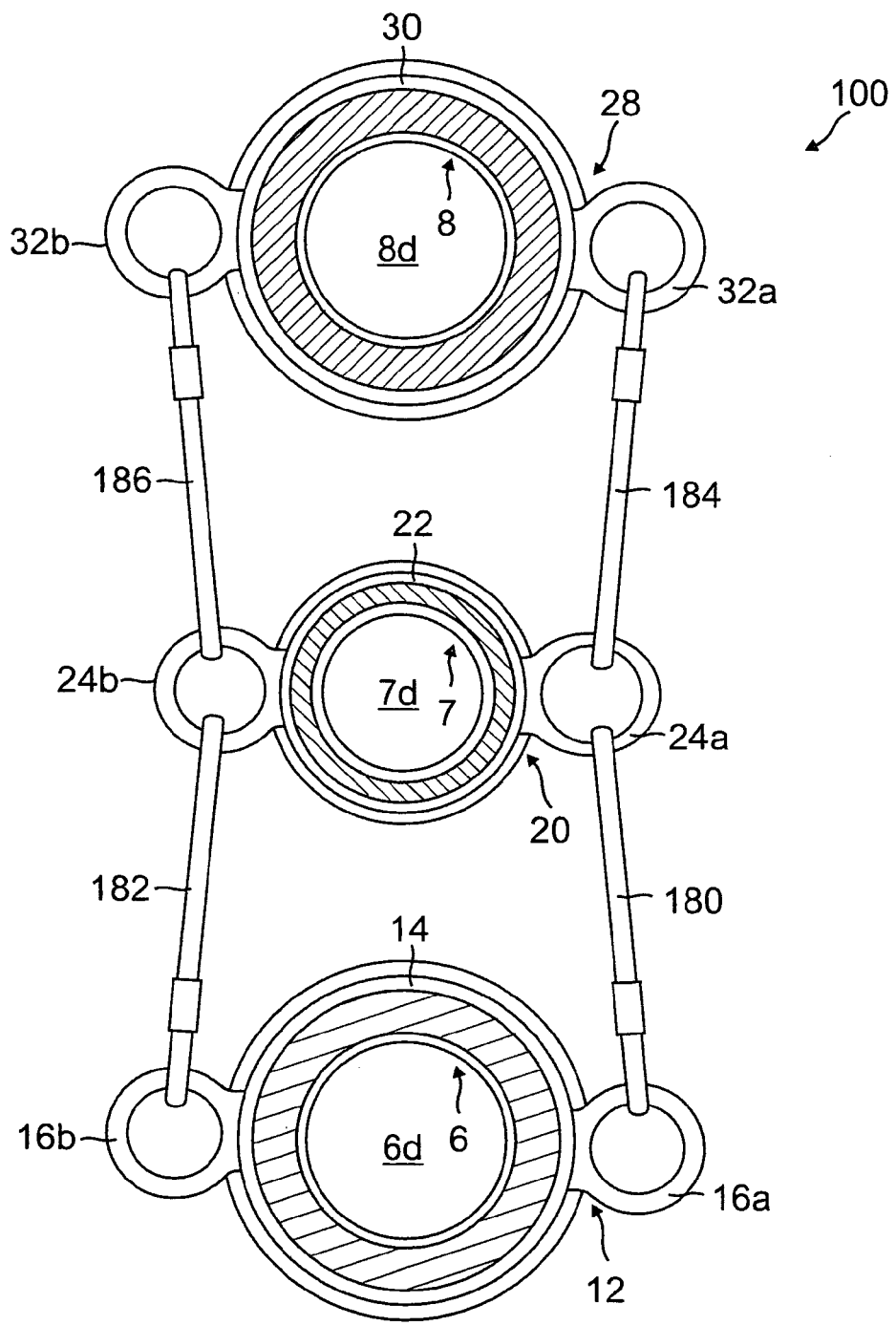
FIG. 6 is an elevational transverse cross sectional view, which illustrates structural variations of the flexible connection within the apparatus of the preferred embodiment of the present invention.

Referring to FIG. 6, there is illustrated a varied apparatus 100 as compared with the preferred apparatus 10. Instead of using two flexible restraining cables, four cables are applied for the varied apparatus 100. A first flexible restraining cable 180 is affixed to the first interconnecting rings 16a and 24a of the respective first and second interlocking units 12 and 20. A second flexibly restraining cable 182 is affixed to the second interconnecting rings 16b and 24b of the respective first and second interlocking units 12 and 20. A third flexible restraining cable 184 is affixed to the first interconnecting rings 24a and 32a of the respective second and third interlocking units 20 and 28. A fourth flexible restraining cable 186 is affixed to the second interconnecting rings 24b and 32b of the respective second and third interlocking units 20 and 28.

It will be appreciated that with the application of the varied apparatus 100 also provides the advantages of the transverse vibrational movement of service loops, as compared with the apparatus 10 in FIG. 2, although movement of the middle service loop 7 of the varied apparatus 100 is more limited.

It will be further appreciated that by using either the apparatus 10 or the varied apparatus 100, all of the service loops 6, 7 and 8 will have bottom loops with a uniform shape of a symmetric water drop when the service loops move up and down. However, such symmetric water drop shaped loops sometimes are not convenient to the operation of the oil well drilling machine. Therefore, there is a need to control the loop shape to form a shape similar to a teardrop shape.

Figure 8:
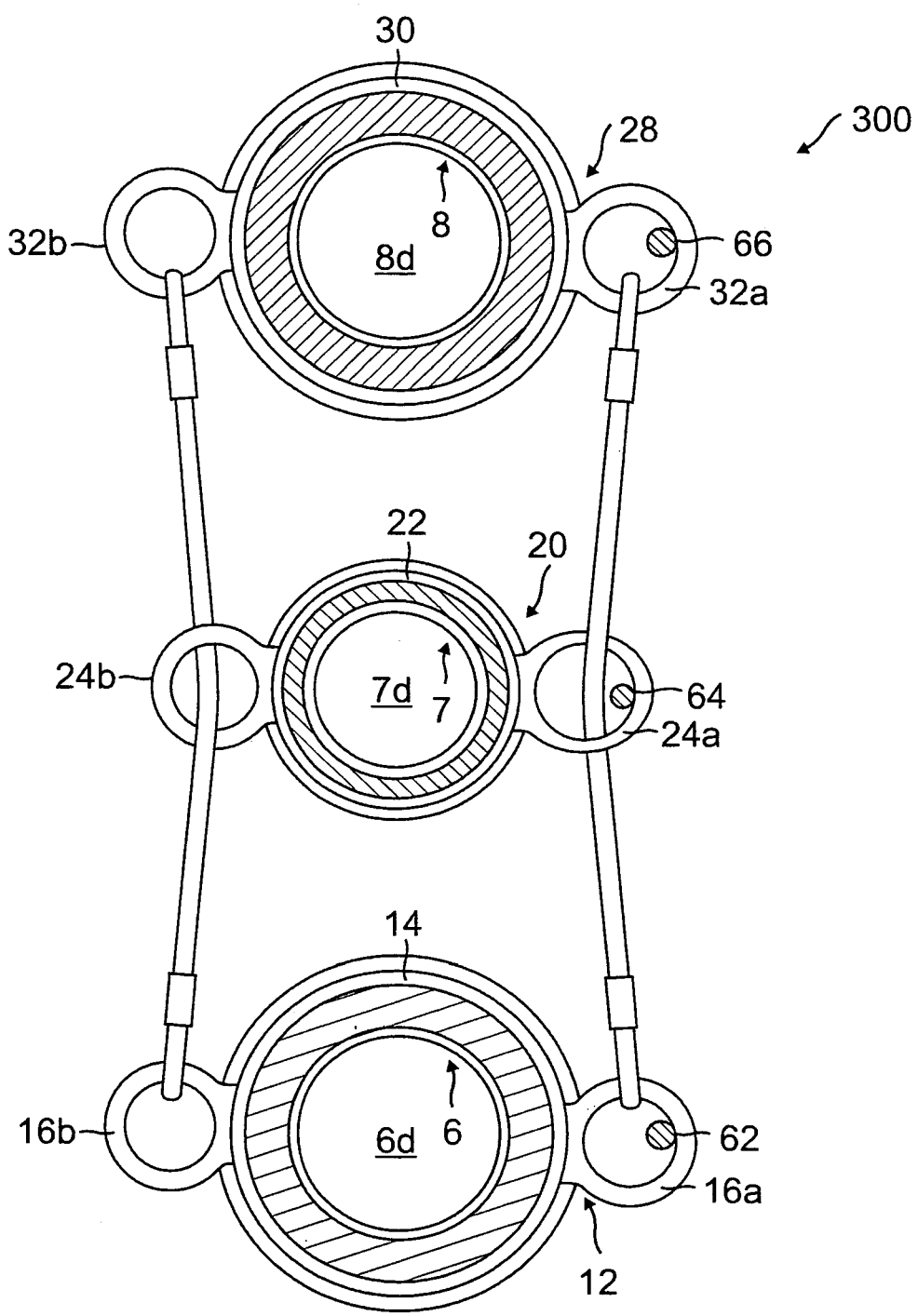
FIG. 8 is an elevational transverse cross sectional view, which shows the apparatus of the preferred embodiment of the present invention with the addition of three longitudinal cables so that it can control service loops having tear-drop shaped loops, which is further illustrated in FIG. 9.
Figure 9:
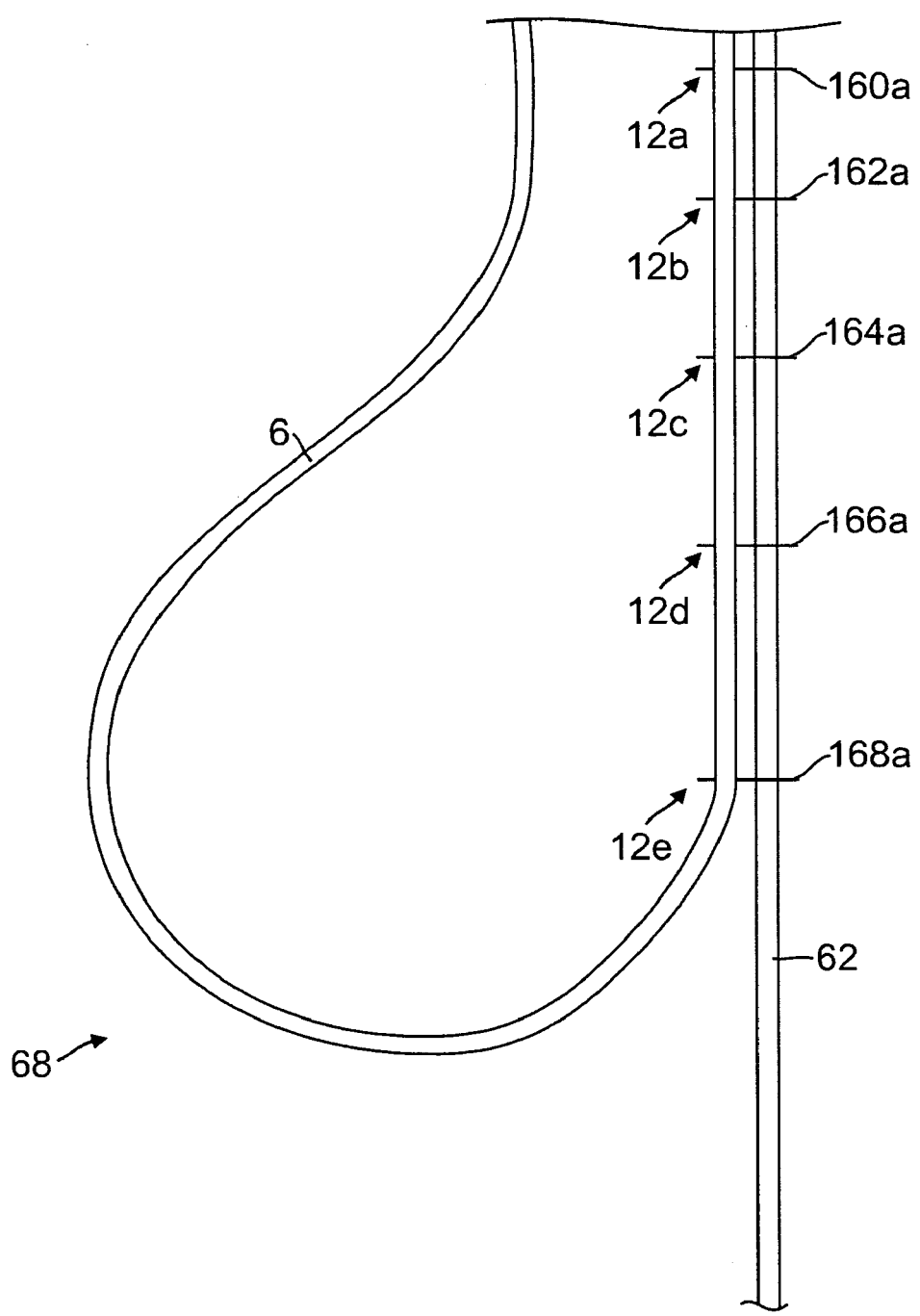
FIG. 9 is a schematic diagram, which uses a service loop as an example to illustrate a controlled shape of the tear-drop of the service loop that is achieved after application of the preferred embodiment of the present invention with an additional longitudinal cable.

Referring to FIGS. 8 and 9, there is illustrated an additional embodiment 300 of the present invention for achieving the controlled tear-drop shaped loops 68 of the service loops in the operation of the oil well drilling machine. The embodiment is comprised of the apparatus having the preferred apparatus 10 with the addition of three longitudinal supporting members 62, 64 and 66. As illustrated in FIG. 8 which discloses the structural configuration of the embodiment 300 in the transverse direction, there are three additional longitudinal supporting members 62, 64 and 66, such as rods or cables where their upper and lower ends are affixed to the oil well drilling tower 1. Each of the members penetrates through the respective first interconnecting rings 16a, 24a and 32a of the respective first, second and third interlocking units 12, 20 and 28. In addition, as illustrated in FIG. 9 which uses the first service loop 6 as an example to disclose the structural configuration of the embodiment 300 in the longitudinal direction, the longitudinally supporting member 62 penetrates through five interconnecting rings 160a, 162a, 164a, 166a and 168a of the respective five first interlocking units 12a, 12b, 12c, 12d and 12e of the preferred service loop 6, which is illustrated in FIG. 5.

Therefore, due to support provided by the longitudinal supporting member 62, the right side of the first service loop 6 is regulated to have an almost straight linear shape to thereby push the left side of the loop leftward, which results in the service loop 6 having the controlled teardrop shape 68.

Figure 7:
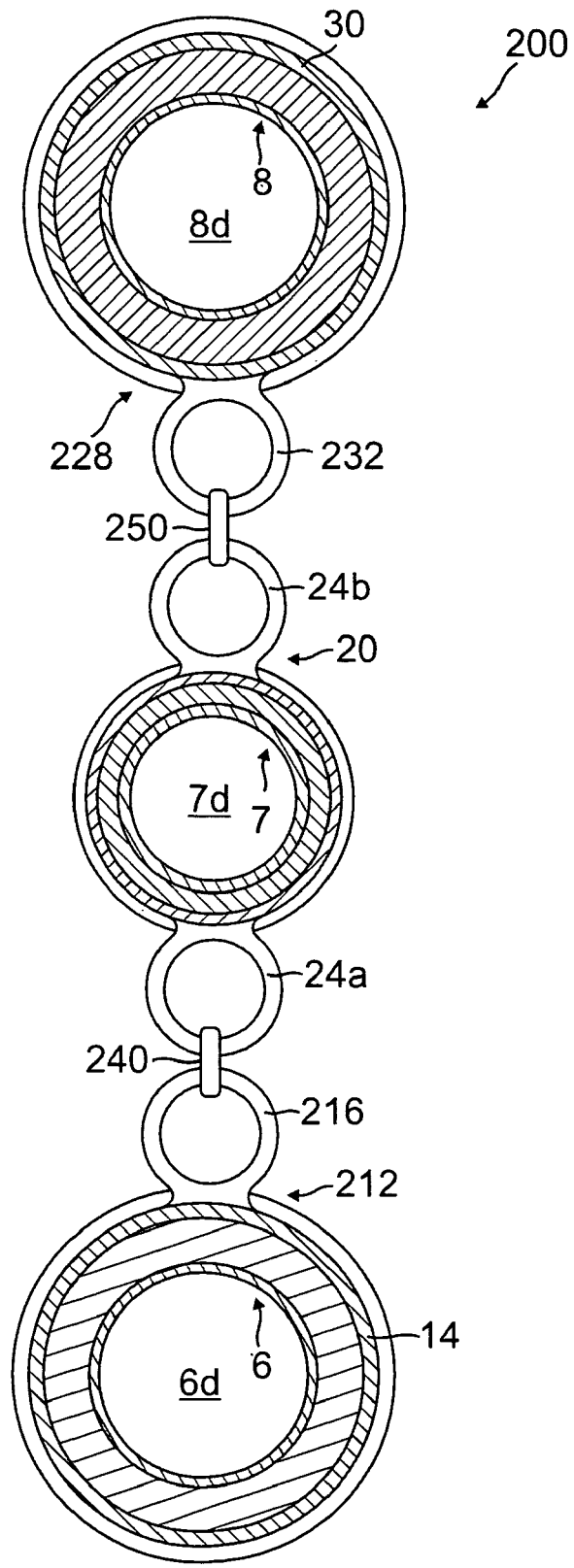
FIG. 7 is an elevational transverse cross sectional view, which illustrates another preferred embodiment of the apparatus from the present invention apparatus to flexibly restrain service loops of the top drive drilling system in an oil drilling tower.

Referring now to FIG. 7, there is illustrated another preferred apparatus 200 of the present invention apparatus. The system containing multiple apparatus 200 can perform equally as the system containing multiple embodiment 10 to flexibly restrain the service loops. It will be appreciated that the apparatus 200 is varied according to the apparatus 10. Therefore, a disclosure of the apparatus 200 will not repeat the structural details which are the same as compared with the apparatus 10, except for varied structural components.

As illustrated, the structural variations of the apparatus 200 include (1) the first and third interlocking units 212 and 228 only have the respective single interconnecting rings 216 and 232 to affix the respective steel rings 14 and 30, (2) two flexibly restraining looped cables 240 and 250 are used, wherein the looped cable 240 connects the interconnecting ring 216 of the first unit 212 and first interconnecting ring 24a of the second interlocking unit 20, and the looped cable 250 connects the interconnecting ring 232 of the third unit 228 and second interconnecting ring 24b of the second interlocking unit 20, and (3) all the interconnection rings are aligned with a central line which penetrates through diameters of the respective service loops 6, 7 and 8. It will be appreciated, with application of a plurality of the apparatus 200, wherein each of them is positioned at different longitudinal levels, the service loops 6, 7, and 8 can be flexibly restrained to thereby have a uniform path and bend radius when they travel longitudinally.

It will be further appreciated that, in a similar fashion as described in FIGS. 8 and 9, with the application of the addition of at least two longitudinal supporting members which penetrate through the respective interconnecting rings 216 and 232 of the first and third interlocking units 212 and 228, or the respective interconnecting rings 216 and second interconnecting ring 24b, or the respective first interconnecting ring 24a and interconnecting ring 232, or the respective first and second interconnecting rings 24a and 24b, it also can achieve the same result of the controlled teardrop shaped loops of the service loops in operation of the oil well drilling machine.

In application of the present invention, although dimensional sizes of the interconnecting rings and cables can vary according particular applications, a preferred ring diameter of the interconnecting rings ranges from one-half inch to three inches, a diameter of the ring cross section ranges from one-eighth inches to a half inch, and a preferred width of the restraining steel cables is ranging from one-eighth inch to one-half inch from regular operations of the oil well drilling machines.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to be used with services loops in an oil derrick, each service loop having a given length with at least an inner liner extending the length of the service loop and having a given diameter and surrounded by a braid extending the length of the service loop and having a given diameter, the apparatus comprising:
   a. a first interior retaining means affixed to the braid of a first service loop and positioned at a given longitudinal location along the length of the first service loop and a first interconnecting means affixed to the first interior retaining means and extending transversely from the first interior retaining means and a second interconnecting means affixed to the first interior retaining means and extending transversely from the first interior retaining means;
   b. a second interior retaining means affixed to the braid of a second service loop and positioned at a given longitudinal location along the length of the second service loop and a first interconnecting means affixed to the second interior retaining means and extending transversely from the second interior retaining means and a second interconnecting means affixed to the second interior retaining means and extending transversely from the second interior retaining means;

c. each respective service loop having an exterior layer which surrounds the braid of that service loop and having a gap at each location of an interconnecting means to enable each interconnecting means of each respective service loop to extend through the exterior layer of each respective service loop;

d. the first interconnecting means of the first service loop aligned with the first interconnecting means of the second service loop and the second interconnecting means of the first service loop aligned with the second interconnecting means of the second service loop; and e. a first flexible affixation means interconnecting the first interconnecting means of the first and second service loops and a second flexible affixation means interconnecting the second interconnecting means of the first and second service loops so that the two service loops are flexibly restrained to thereby prevent the two service loops from entangling as they move up and down the oil derrick.

2. The apparatus in accordance with claim 1 wherein the first interior retaining means and the second interior retaining means each further comprises a central ring formed by combining a multiplicity of sections together which encircle the braid with at least some of the sections affixed to the braid.

3. The apparatus in accordance with claim 2 wherein the sections of the central ring are made from material selected from the group consisting of metal and synthetic polymer.

4. The apparatus in accordance with claim 2 wherein the first interconnecting means and the second interconnecting means each further comprises a member respectively affixed to at least one section of the central ring, the member selected from the group consisting of a round ring with an opening therethrough, a D-shaped ring with an opening between a second of the central ring and an exterior circumference of the D-shaped ring, and a member having an arcuate wall with an opening between a section of the central ring and the arcuate wall.

5. The apparatus in accordance with claim 4 wherein the first interconnecting means and the second interconnecting means are made from material selected from the group consisting of metal and synthetic polymer.

6. The apparatus in accordance with claim 4 wherein the first flexible affixation means and the second flexible affixation means are each a cable respectively extending through a respective opening in the first and second interconnecting means.

7. The apparatus in accordance with claim 1 wherein the outer layer is a jacket selected from the group consisting of an outer liner, self-adhesive applied to the braid, enhanced thermoplastic and rubber.

8. An apparatus to be used with services loops in an oil derrick in accordance with claim 1 further having a third service loop having a given length with at least an inner liner extending the length of the third service loop and having a given diameter and surrounded by a braid extending the length of the third service loop and having a given diameter, the service loops arranged so that second service loop is between the first and third service loops, the apparatus further comprising:

a. a third interior retaining means affixed to the braid of the third service loop and positioned at a given longitudinal location along the length of the third service loop and a first interconnecting means affixed to the third interior retaining means and extending transversely from the third interior retaining means and a second interconnecting means affixed to the third interior retaining means and extending transversely from the third interior retaining means;

b. the third service loop having an exterior layer which surrounds the braid of the third service loop and having a gap at each location of an interconnecting means to enable each interconnecting means of the third service loop to extend through the exterior layer of the third service loop;

c. the first interconnecting means of the third service loop aligned with the first interconnecting means of the second service loop and the second interconnecting means of the third service loop aligned with the second interconnecting means of the second service loop;

d. a third flexible affixation means interconnecting the first interconnecting means of the second and third service loops and a fourth flexible affixation means interconnecting the second interconnecting means of the second and third service loops so that the three service loops are flexibly restrained to thereby prevent the three service loops from entangling as they move up and down the oil derrick.

9. The apparatus in accordance with claim 8 wherein the first, second and third interior retaining means each further comprises a central ring formed by combining a multiplicity of sections together which encircle the braid with at least some of the sections affixed to the braid.

10. The apparatus in accordance with claim 9 wherein the sections of the central ring are made from material selected from the group consisting of metal and synthetic polymer.

11. The apparatus in accordance with claim 9 wherein the first interconnecting means and the second interconnecting means each further comprises a member respectively affixed to at least one section of the central ring, the member selected from the group consisting of a round ring with an opening therethrough, a D-shaped ring with an opening between a second of the central ring and an exterior circumference of the D-shaped ring, and a member having an arcuate wall with an opening between a section of the central ring and the arcuate wall.

12. The apparatus in accordance with claim 11 wherein the first interconnecting means and the second interconnecting means are made from material selected from the group consisting of metal and synthetic polymer.

13. The apparatus in accordance with claim 11 wherein the first flexible affixation means, the second flexible affixation means, the third flexible affixation means, and the fourth flexible affixation means are each a cable, the first flexible affixation means extending through a respective opening in the first interconnecting means of the first and second service loop, the second flexible affixation means extending through an opening in the second interconnecting means of the first and second service loops, the third flexible affixation means extending through an opening in the first interconnecting means of the second and third service loops and the fourth flexible affixation means extending through an opening in the second interconnecting means of the second and third service loops.

14. The apparatus in accordance with claim 8 wherein the outer layer is a jacket selected from the group consisting of an outer liner, self-adhesive applied to the braid, enhanced thermoplastic and rubber.

15. An apparatus to be used with service loops in an oil derrick, each service loop having a given length with at least an inner liner extending the length of the service loop and having a given diameter and surrounded by a braid extending the length of the service loop and having a given diameter, the apparatus having a multiplicity of spaced apart sets of flexible restraining means, each set of flexible restraining means comprising:

a. a first interior retaining means affixed to the braid of the first service loop and positioned at a given longitudinal location along the length of the first service loop and a first interconnecting means affixed to the first interior retaining means and extending transversely from the first interior retaining means and a second interconnecting means affixed to the first interior retaining means and extending transversely from the first interior retaining means;

b. a second interior retaining means affixed to the braid of a second service loop and positioned at a given longitudinal location along the length of the second service loop and a first interconnecting means affixed to the second interior retaining means and extending transversely from the second interior retaining means and a second interconnecting means affixed to the second interior retaining means and extending transversely from the second interior retaining means;

c. each set of interior retaining means and first and second interconnecting means on the first and second service loops spaced apart from an adjacent set of interior retaining means and first and second interconnecting means by a given distance so that the sets are positioned along the length of each service loop and are aligned along the length of each service loop;

d. each respective service loop having an exterior layer which surrounds the braid of that service loop and having a gap at each location of an interconnecting means to enable each interconnecting means of each respective service loop to extend through the exterior layer of each respective service loop;

e. for each given set of flexible restraining means, the first interconnecting means of the first service loop aligned with the first interconnecting means of the second service loop and the second interconnecting means of the first service loop aligned with the second interconnecting means of the second service loop; and f. for each set of flexible restraining means, a first flexible affixation means interconnecting the first interconnecting means of the first and second service loops and a second flexible affixation means interconnecting the second interconnecting means of the first and second service loops so the multiplicity of sets of flexible retraining means cause the two service loops to be flexibly restrained at a multiplicity of locations along the length of the two service loops to thereby prevent the two service loops from entangling as they move up and down the oil derrick.

16. An apparatus to be used with services loops in an oil derrick in accordance with claim 15, further having a third service loop having a given length with at least an inner liner extending the length of the third service loop and having a given diameter and surrounded by a braid extending the length of the third service loop having a given diameter, the service loops arranged so that the second service loop is between the first and third service loops, the third service loop having a multiplicity of spaced apart sets of flexible restraining means, each set of flexible restraining means comprising:

a. a third interior retaining means affixed to the braid of the third service loop and positioned at a given longitudinal location along the length of the third service loop and a first interconnecting means affixed to the third interior retaining means and extending transversely from the third interior retaining means and a second interconnecting means affixed to the third interior retaining means and extending transversely from the first interior retaining means;

b. each set of interior retaining means and first, second and third interconnecting means on the first, second and third service loops spaced apart from an adjacent set of interior retaining means and first and second interconnecting means by a given distance so that the sets are positioned along the length of each service loop and are aligned along the length of each service loop;

c. each respective service loop having an exterior layer which surrounds the braid of that service loop and having a gap at each location of an interconnecting means to enable each interconnecting means of each respective service loop to extend through the exterior layer of each respective service loop;

d. for each given set of flexible restraining means, the first interconnecting means of the first service loop aligned with the first interconnecting means of the second service loop and the first interconnecting means of the second service loop aligned with the first interconnecting means of the third service loop, and the second interconnecting means of the first service loop aligned with the second interconnecting means of the second service loop and the second interconnecting means of the second service loop aligned with the second interconnecting means of the third service loop; and e. for each set of flexible restraining means, a first flexible affixation means interconnecting the first interconnecting means of the first and second service loops and a second flexible affixation means interconnecting the second interconnecting means of the first and second service loops, a third flexible affixation means interconnecting the first interconnecting means of the second and third service loops, and a fourth flexible affixation means interconnecting the second interconnecting means of the second and third service loops, so the multiplicity of sets of flexible retraining means cause the three service loops to be flexibly restrained at a multiplicity of locations along the length of the three service loops to thereby prevent the three service loops from entangling as they move up and down the oil derrick.

17. The apparatus in accordance with claim 16 wherein for each set the first, second and third interior retaining means each further comprises a central ring formed by combining a multiplicity of sections together which encircle the braid with at least some of the sections affixed to the braid.

18. The apparatus in accordance with claim 17 wherein for each set the sections of the central ring are made from material selected from the group consisting of metal and synthetic polymer.

19. The apparatus in accordance with claim 17 wherein for each set the first interconnecting means and the second interconnecting means each further comprises a member respectively affixed to at least one section of the central ring, the member selected from the group consisting of a round ring with an opening therethrough, a D-shaped ring with an opening between a second of the central ring and an exterior circumference of the D-shaped ring, and a member having an arcuate wall with an opening between a section of the central ring and the arcuate wall.

20. The apparatus in accordance with claim 19 wherein for each set the first interconnecting means and the second interconnecting means are made from material selected from the group consisting of metal and synthetic polymer.

21. The apparatus in accordance with claim 19 wherein for each first set first of flexible affixation means and the second flexible set of affixation means of the first and second service loops are each a first cable respectively extending through a respective opening in the first interconnecting means of the first and second service loops and a second cable extending through a respective opening in the second interconnecting means of the second and third service loops, and a third cable respectively extending through a respective opening in the first interconnecting means of the second and third service loops and a fourth cable respectively extending through a respective opening in the second interconnecting means of the second and third service loops.

22. The apparatus in accordance with claim 16 wherein the outer layer is a jacket selected from the group consisting of an outer liner, self-adhesive applied to the braid, enhanced thermoplastic and rubber.

23. The apparatus in accordance with claim 16, further comprising:
   a. a first longitudinal supporting member affixed to the oil derrick and extending through an aligned opening in a respective first interconnecting member of each set of flexible restraining means of the first service loop;
   b. a second longitudinal supporting member affixed to the oil derrick and extending through an aligned opening in a respective first interconnecting member of each set of flexible restraining means of the second service loop; and
   c. a third longitudinal supporting member affixed to the oil derrick and extending through an aligned opening in a respective first interconnecting member of each set of flexible restraining means of the third service loop.

24. The apparatus in accordance with claim 15 wherein for each set the first interior retaining means and the second interior retaining means each further comprises a central ring formed by combining a multiplicity of sections together which encircle the braid with at least some of the sections affixed to the braid.

25. The apparatus in accordance with claim 24 wherein for each set the sections of the central ring are made from material selected from the group consisting of metal and synthetic polymer.

26. The apparatus in accordance with claim 24 wherein for each set the first interconnecting means and the second interconnecting means each further comprises a member respectively affixed to at least one section of the central ring, the member selected from the group consisting of a round ring with an opening therethrough, a D-shaped ring with an opening between a second of the central ring and an exterior circumference of the D-shaped ring, and a member having an arcuate wall with an opening between a section of the central ring and the arcuate wall.

27. The apparatus in accordance with claim 26 wherein for each set the first interconnecting means and the second interconnecting means are made from material selected from the group consisting of metal and synthetic polymer.

28. The apparatus in accordance with claim 26 wherein for each set the first-flexible affixation means and the second flexible affixation means are each a cable respectively extending through a respective opening in the first and second interconnecting means.

29. The apparatus in accordance with claim 15 wherein the outer layer is a jacket selected from the group consisting of an outer liner, self-adhesive applied to the braid, enhanced thermoplastic and rubber.

30. The apparatus in accordance with claim 15, further comprising:
   a. a first longitudinal supporting member affixed to the oil derrick and extending through an aligned opening in a respective first interconnecting member of each set of flexible restraining means of the first service loop; and
   b. a second longitudinal supporting member affixed to the oil derrick and extending through an aligned opening in a respective first interconnecting member of each set of flexible restraining means of the second service loop.

31. An apparatus to be used with services loops in an oil derrick, each service loop having a given length with at least an inner liner extending the length of the service loop and having a given diameter and surrounded by a braid extending the length of the service loop and having a given diameter, the apparatus comprising:
   a. a first interior retaining means affixed to the braid of a first service loop and positioned at a given longitudinal location along the length of the first service loop and a first interconnecting means affixed to the first interior retaining means and extending transversely from the first interior retaining means;
   b. a second interior retaining means affixed to the braid of a second service loop and positioned at a given longitudinal location along the length of the second service loop and a first interconnecting means affixed to the second interior retaining means and extending transversely from the second interior retaining means;
   c. a third interior retaining means affixed to the braid of a third service loop and positioned at a given longitudinal location along the length of the third service loop and a first interconnecting means affixed to the third interior retaining means and extending transversely from the third interior retaining means;
   c. each respective service loop having an exterior layer which surrounds the braid of that service loop and having a gap at each location of an interconnecting means to enable each interconnecting means of each respective service loop to extend through the exterior layer of each respective service loop;
   d. the first interconnecting means of the first service loop aligned with the first interconnecting means of the second service loop and the first interconnecting means of the second service loop aligned with the first interconnecting means of the third service loop; and
   e. a first flexible affixation means interconnecting the first interconnecting means of the first and second service loops and a second flexible affixation means interconnecting the first interconnecting means of the second and third service loops so that the three service loops are flexibly restrained to thereby prevent the three service loops from entangling as they move up and down the oil derrick.

32. The apparatus in accordance with claim 31 wherein the first interior retaining means, the second interior retaining means, and the third interior retaining means each further comprises a central ring formed by combining a multiplicity of sections together which encircle the braid with at least some of the sections affixed to the braid.

33. The apparatus in accordance with claim 32 wherein the sections of the central ring are made from material selected from the group consisting of metal and synthetic polymer.

34. The apparatus in accordance with claim 32 wherein the each first interconnecting means further comprises a member respectively affixed to at least one section of the central ring, the member selected from the group consisting of a round ring with an opening therethrough, a D-shaped ring with an opening between a second of the central ring and an exterior circumference of the D-shaped ring, and a member having an arcuate wall with an opening between a section of the central ring and the arcuate wall.

35. The apparatus in accordance with claim 34 wherein each first interconnecting means are made from material selected from the group consisting of metal and synthetic polymer.

36. The apparatus in accordance with claim 34 wherein the first flexible affixation means is a cable respectively extending through a respective opening in the first interconnecting means of the first and second service loops, the second flexible affixation means is a cable respectively extending through an opening in the first interconnecting means of the second and third service loops.

37. The apparatus in accordance with claim 31 wherein the outer layer is a jacket selected from the group consisting of an outer liner, self-adhesive applied to the braid, enhanced thermoplastic and rubber.

38. An apparatus to be used with services loops in an oil derrick, each service loop having a given length with at least an inner liner extending the length of the service loop and having a given diameter and surrounded by a braid extending the length of the service loop and having a given diameter, the apparatus having a multiplicity of spaced apart sets of flexible restraining means, each set of flexible restraining means comprising:
  a. a first interior retaining means affixed to the braid of a first service loop and positioned at a given longitudinal location along the length of the first service loop and a first interconnecting means affixed to the first interior retaining means and extending transversely from the first interior retaining means;
  b. a second interior retaining means affixed to the braid of a second service loop and positioned at a given longitudinal location along the length of the second service loop and a first interconnecting means affixed to the second interior retaining means and extending transversely from the second interior retaining means;
  c. a third interior retaining means affixed to the braid of a third service loop and positioned at a given longitudinal location along the length of the third service loop and a first interconnecting means affixed to the third interior retaining means and extending transversely from the third interior retaining means;
  d. each set of interior retaining means and interconnecting means on the first, second and third service loops spaced apart from an adjacent set of interior retaining means and interconnecting means by a given distance so that the sets are positioned along the length of each service loop and aligned along the length of each service loop;
  e. each respective service loop having an exterior layer which surrounds the braid of that service loop and having a gap at each location of an interconnecting means to enable each interconnecting means of each respective service loop to extend through the exterior layer of each respective service loop;
  f. for each set of flexible restraining means, the first interconnecting means of the first service loop aligned with the first interconnecting means of the second service loop and the first interconnecting means of the second service loop aligned with the first interconnecting means of the third service loop; and
  g. for each set of flexible restraining means, a first flexible affixation means interconnecting the first interconnecting means of the first and second service loops and a second flexible affixation means interconnecting the first interconnecting means of the second and third service loops so that the multiplicity of sets of flexible restraining means cause the three service loops to be flexibly restrained at a multiplicity of locations along the length of the three service loops to thereby prevent the three service loops from entangling as they move up and down the oil derrick.

39. The apparatus in accordance with claim 38 wherein each first interconnecting means further comprises a member affixed to the central one piece ring, the member selected from the group consisting of a round ring with an opening therethrough, a D-shaped ring with an opening between the central ring and an exterior circumference of the D-shaped ring, and a member having an arcuate wall with an opening between the central ring and the arcuate wall.

40. The apparatus in accordance with claim 39 wherein the first interconnecting means and the second interconnecting means are made from material selected from the group consisting of metal and synthetic polymer.

41. The apparatus in accordance with claim 39 wherein the first flexible affixation means is a cable respectively extending through a respective opening in the first interconnecting means of the first and second service loops, the second flexible affixation means is a cable extending through an opening in the first interconnecting means of the second and third service loops.

42. The apparatus in accordance with claim 38 wherein the first, second and third interior retaining means each further comprises a central ring formed by combining a multiplicity of sections together which encircle the braid with at least some of the sections affixed to the braid.

43. The apparatus in accordance with claim 42 wherein the sections of the central ring are made from material selected from the group consisting of metal and synthetic polymer.

44. The apparatus in accordance with claim 38 wherein each first interconnecting means and the second interconnecting means are made from material selected from the group consisting of metal and synthetic polymer.

45. The apparatus in accordance with claim 38 wherein the outer layer is a jacket selected from the group consisting of an outer liner, self-adhesive applied to the braid, enhanced thermoplastic and rubber.

46. An apparatus to be used with services loops in an oil derrick, each service loop having a given length with at least an inner liner extending the length of the service loop and having a given diameter and surrounded by a braid extending the length of the service loop and having a given diameter, the apparatus comprising:
  a. a first interior retaining means affixed to the braid of a first service loop and positioned at a given longitudinal location along the length of the first service loop and at least one interconnecting means affixed to the first interior retaining means and extending transversely from the first interior retaining means;
  b. a second interior retaining means affixed to the braid of a second service loop and positioned at a given longitudinal location along the length of the second service loop and at least one interconnecting means affixed to the second interior retaining means and extending transversely from the second interior retaining means;
  c. a third interior retaining means affixed to the braid of a third service loop and positioned at a given longitudinal location along the length of the third service loop and at least one interconnecting means affixed to the third interior retaining means and extending transversely from the third interior retaining means;
  d. each respective service loop having an exterior layer which surrounds the braid of that service loop and having a gap at each location of an interconnecting means to enable each interconnecting means of each respective service loop to extend through the exterior layer of each respective service loop;

e. the at least one interconnecting means of the first service loop aligned with the at least one interconnecting means of the second service loop and at last one interconnecting means of the second service loop aligned with the at least one interconnecting means of the third service loop; and f. a flexible affixation means interconnecting the at least one interconnecting means of the first and second service loops and a second flexible interconnecting means connecting the at least one flexible interconnecting means of the second and third service loops so that the three service loops are flexibly restrained to thereby prevent the three service loops from entangling as they move up and down the oil derrick.

47. An apparatus to be used with services loops in an oil derrick, each service loop having a given length with at least an inner liner extending the length of the service loop and having a given diameter and surrounded by a braid extending the length of the service loop and having a given diameter, the apparatus having a multiplicity of spaced apart sets of flexible restraining means, each set of flexible restraining means comprising:

a. a first interior retaining means affixed to the braid of a first service loop and positioned at a given longitudinal location along the length of the first service loop and at least one interconnecting means affixed to the first interior retaining means and extending transversely from the first interior retaining means;

b. a second interior retaining means affixed to the braid of a second service loop and positioned at a given longitudinal location along the length of the second service loop and at least one interconnecting means affixed to the second interior retaining means and extending transversely from the second interior retaining means;

c. a third interior retaining means affixed to the braid of a third service loop and positioned at a given longitudinal location along the length of the third service loop and at least one interconnecting means affixed to the third interior retaining means and extending transversely from the third interior retaining means;

d. each set of interior restraining means and at least one interconnecting means on the first, second and third service loops spaced apart from an adjacent set of interior restraining means and at least interconnecting means by a given distance so that the sets are positioned along the length of each service loop and are aligned along the length of each service loop;

e. each respective service loop having an exterior layer which surrounds the braid of that service loop and having a gap at each location of an interconnecting means to enable each interconnecting means of each respective service loop to extend through the exterior layer of each respective service loop;

f. for each set of flexible restraining means, the at least one interconnecting means of the first service loop aligned with the at least one interconnecting means of the second service loop and at last one interconnecting means of the second service loop aligned with the at least one interconnecting means of the third service loop; and g. for each set of flexible restraining means there is a first flexible affixation means interconnecting the at least one interconnecting means of the first and second service loops and a second flexible affixation means interconnecting the at least one interconnecting means of the second and third service loops, so that the three service loops are flexibly restrained to thereby prevent the three service loops from entangling as they move up and down the oil derrick.

48. The apparatus in accordance with claim 47, further comprising:

a. a first longitudinal supporting member affixed to the oil derrick and extending through an aligned opening in a respective at least one interconnecting member of each set of flexible restraining means of the first service loop;

b. a second longitudinal supporting member affixed to the oil derrick and extending through an aligned opening in a respective at least one interconnecting member of each set of flexible restraining means of the second service loop; and c. a third longitudinal supporting member affixed to the oil derrick and extending through an aligned opening in a respective at least one interconnecting member of each set of flexible restraining means of the third service loop.

* * * * *